United States Patent [19]
Yocum et al.

[11] Patent Number: 5,255,879
[45] Date of Patent: Oct. 26, 1993

[54] THREE AXES STABILIZED SPACECRAFT AND METHOD OF SUN ACQUISITION

[75] Inventors: John F. Yocum, Rancho Palos Verdes; Mike W. Tolmasoff, Whittier; Thomas D. Faber, Woodland Hills, all of Calif.

[73] Assignee: Hughes Aircraft Company, Los Angeles, Calif.

[21] Appl. No.: 800,659

[22] Filed: Nov. 27, 1991

[51] Int. Cl.$^5$ .............................................. B64G 1/36
[52] U.S. Cl. ..................................... 244/171; 244/164
[58] Field of Search ................... 244/164, 171, 165; 342/355, 356, 357; 250/203.4

[56] References Cited

U.S. PATENT DOCUMENTS

| | | | |
|---|---|---|---|
| 4,358,076 | 11/1982 | Lange et al. | 244/164 |
| 5,080,307 | 1/1992 | Smay et al. | 244/164 |
| 5,132,910 | 7/1992 | Scheit et al. | 244/164 |

Primary Examiner—Joseph F. Peters, Jr.
Assistant Examiner—Anne E. Bidwell
Attorney, Agent, or Firm—Gordon R. Lindeen, III; Wanda Denson-Low

[57] ABSTRACT

A method of sun search and acquisition is disclosed for a spacecraft (18) which is stabilized in three axes. The method utilizes three axes gyro rate and integrated rate sensing together with three simple slit type sensors (10, 20, 30, 40). The method starts from an arbitrary attitude and from body rates up to the limits of the gyro rate sensors and is comprised of a rate nulling step followed by two consecutive simple search procedures. One search procedure is about the pitch axis until alignment of the sun with the roll/pitch plane and the other search procedure is about the yaw axis until alignment of the sun with the roll axis. The sun acquisition culminates in pointing the roll axis of the spacecraft (18) toward the sun. By using slit type sun sensors (10, 20, 30, 40) versus a wide field of view sensor it is easier to find a mounting location on a spacecraft (18) which is free from spurious reflections off other parts of the spacecraft.

13 Claims, 2 Drawing Sheets

THREE AXES STABILIZED SPACECRAFT AND METHOD OF SUN ACQUISITION

BACKGROUND OF THE INVENTION

1. Field of the Invention

This invention relates to a three axis stabilized spacecraft and a method of sun acquisition for the spacecraft utilizing narrow field of view sun sensors.

2. Description of Related Art

An earlier method of sun acquisition is described in U.S. Pat. No. 4,358,076 to Lange. That method uses three sensors each having a rectangular field of view that must be wide enough so that the spacecraft control system can stop rotation of the spacecraft while the sun is within the field of view of the sensors, typically, $\pm 30°$ by $\pm 60°$. A significant problem with sensors having such a wide field of view is the reception of sunlight reflected from spacecraft appendages such as antennas or solar arrays.

SUMMARY OF THE INVENTION

The method of sun search and acquisition of the present invention utilizes three axes gyro rate and integrated rate sensing together with three simple slit type sun sensors, one of which may be used for another spacecraft function,. The sensors are mounted to the spacecraft as shown in FIG. 2 with one sensor having a sensing plane aligned with the xz plane of the spacecraft and including the x axis. The other two sensors each have sensing planes, aligned with the spacecraft xy plane and including the x axis and which are also symmetrical about the x axis.

The method starts from an arbitrary attitude and from body rates up to the limits of the gyro rate sensors with the goal being alignment of the sun line of sight with the x axis. The spacecraft is rotated about the y axis while the x and z rates are nulled until the sun is aligned in the xy plane. After initial alignment, the sun angle is sensed and propagated in time by integrating the y axis gyro rate measurement. A position and rate control logic is activated to cause the spacecraft to return to alignment of the xy plane with the sun line of sight. Overshoot of the sensor field of view is of no consequence. The above process is then repeated for rotation about the z axis until the sun is aligned with the x axis.

Further objects, features and advantages of the invention will become apparent from a consideration of the following description and the appended claims in connection with the accompanying drawings.

DETAILED DESCRIPTION OF THE INVENTION

Figure 1:
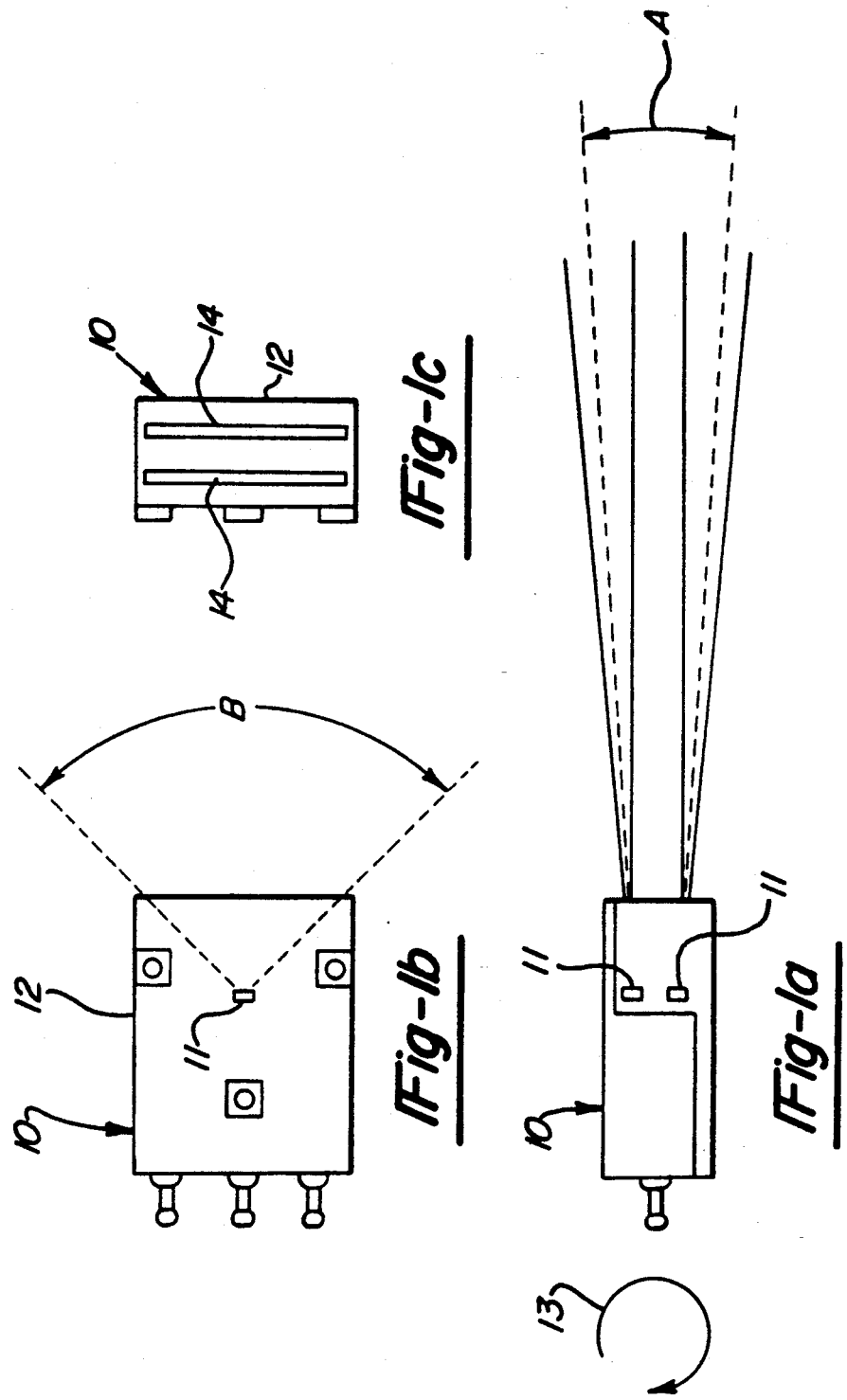
FIGS. 1a, 1b and 1c are front, top and end views, respectively, of sun sensors used on a spacecraft for performing the method of the present invention.

The sun acquisition method of the present invention employs three sun sensors such as sun sensor 10 shown in FIGS. 1a, 1b and 1c. The sensor 10 includes two solar cells 11 that output a small current when sunlight impinges on the solar cells. A housing 12 surrounds the solar cells and includes a pair of narrow slits 14 that define the field of view for the sensors. The narrow slits result in a field of view narrow in one direction. By making the field of view narrow in one direction, the opportunity for reception of reflected light in the sensor is dramatically reduced, giving the spacecraft designer wider latitude in placement of the sensors on a spacecraft.

The prior art teaches the use of sensors with a field of view wide enough to enable the spacecraft thrusters to stop spacecraft rotation without the sun leaving the sensor field of view. Typical sensor fields of view of $\pm 60°$ by $\pm 30°$ are used. The method of the present invention, by allowing the sun line of sight to overshoot the sensor field of view, can utilize narrower sensor fields of view. The narrower the field of view, the better for avoiding reflected light. A minimum angle must be maintained to ensure proper alignment of the field of view with the spacecraft. In a preferred embodiment, the angular width of the field of view in the narrow direction, indicated as angle A, is as small as $\pm 1.5°$. It is preferred that the fields of view of the sensors be no more than $\pm 5°$ in width so as to avoid the reception of sunlight reflected from spacecraft appendages. However, the method of the invention can be used with wider fields of view.

In the narrow direction, indicated as the direction of vehicle rotation in FIG. 1a by arrow 13, the sensor provides an analog signal roughly proportional to the rotational angle of the spacecraft as long as the sun is within the sensor field of view. For the sensor 10, this proportional signal is obtained as the difference of the outputs of the two solar cells divided by the sum of the two outputs. A sun presence signal is obtained by summing the two outputs. The sensors have a planar null position corresponding to a position in which sunlight is received equally by both solar cells and the proportional output signal is then zero.

Figure 2:
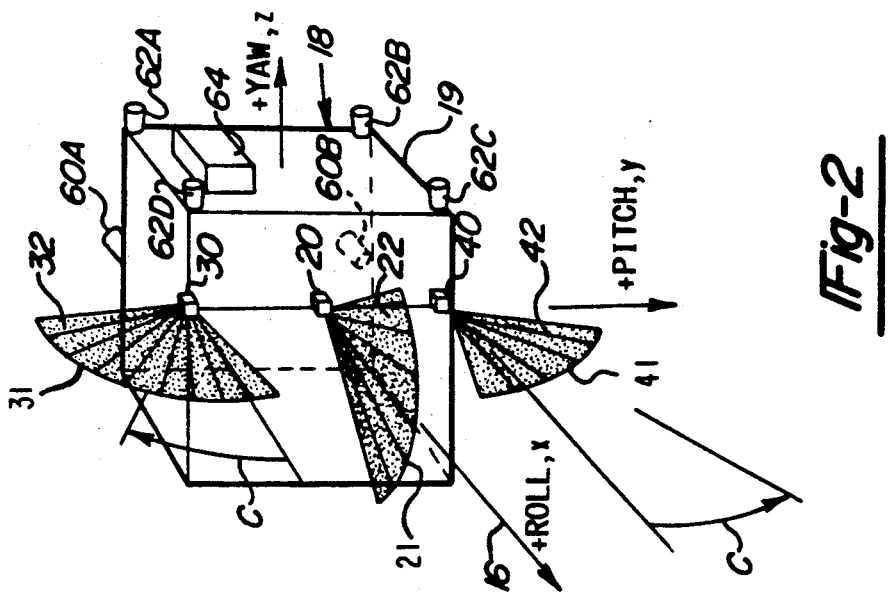
FIG. 2 is a perspective view showing the orientation of the sensing planes of the sun sensors as mounted to a spacecraft.

With reference to FIG. 2 a spacecraft 18 having a body 19 is shown with three sensors 20, 30 and 40 like sensor 10. The null positions of the sensors form sensing planes shown as fan beams 22, and 32 and 42 respectively. The spacecraft is also equipped with representative thrusters 60A and 60B positioned to produce opposite torques about the yaw axis, and thrusters 62A, 62B, 62C and 62D at the corners of the spacecraft to produce cross-coupled torques about the roll and pitch axes. Additional thrusters can be added in well known fashion to produce redundant spacecraft control. A spacecraft controller 64 receives inputs from the sensors 20, 30 and 40 for use in commanding the thrusters for the maneuvers described below. The controller also measures spacecraft attitude dynamics.

The modulation method of the invention, as illustrated, is intended to culminate acquisition of the sun line of sight with the roll axis 16. While the roll axis has been chosen for describing the present invention, it is to be understood that the method can be used to orient any desired location of the spacecraft toward the sun and defining three mutually orthogonal axes relative to that spacecraft location. The actual location of the sensors on the spacecraft is immaterial. Only the orientation of the fields of view is relevant.

Sensor 20 is positioned on spacecraft 18 with its bore sight, the center of the sensor field of view 22, positioned on the roll axis and with its null position sensing plane 21 lying in the roll/yaw plane. The other two sensors 30, 40 have their null position sensing planes 31 and 41 in the roll/pitch plane but are offset symmetrically from the roll axis by an angle "C" slightly less than half of the field of view elongated width "B" (FIG. 1). This ensures that each of the fields of view 32 and 42 of sensors 30 and 40 encompass the roll axis 16. Other alignment configurations are possible with the impact that the search algorithm would be altered as to which axes the searches are about. All three sensor's fields of view include the axis which is ultimately to be pointed at the sun and the elongated fields of view of sensors 30 and 40 are oriented in the narrow direction of the field of view of sensor 20. Preferably, the fields of view 32 and 42 together encompass a range between about ±45° to ±80° of the roll/pitch plane.

Figure 3:
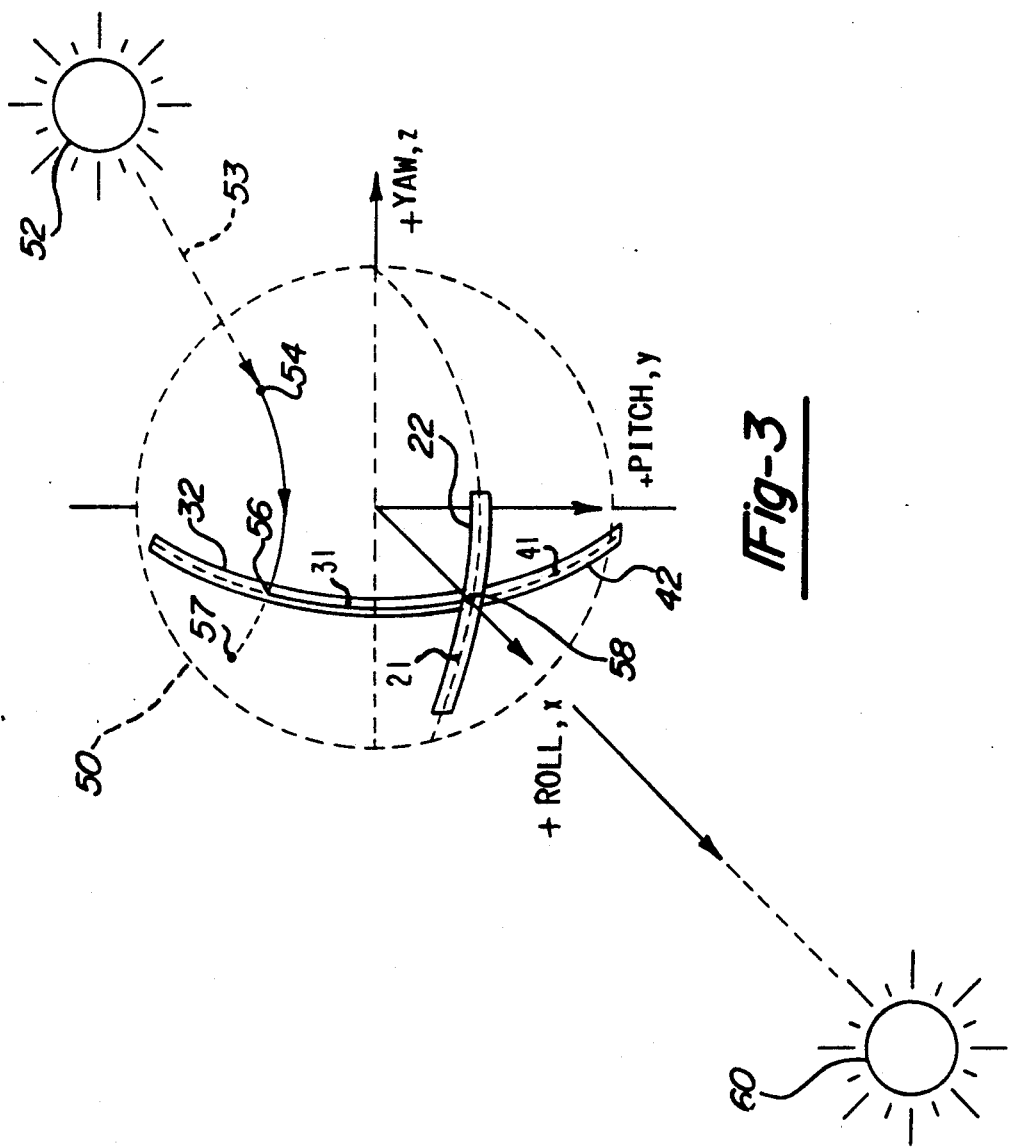
FIG. 3 is a spacecraft unit sphere, including the sun sensors fields of views, used to illustrate the method of the present invention.

The acquisition method of the present invention is illustrated with respect to FIG. 3 in relation to a unit sphere 50 of a spacecraft. Feasible initial conditions for the acquisition method include arbitrary attitude and body rates as high as the gyro range and spacecraft structure permits. A first step is to null body rates about all axes and a time period can be allowed for rates to reach near zero. A threshold test on rates may be incorporated as a condition to proceed to the next step. The sun sensor outputs are ignored in this step. Assume an initial sun position designated by sun 52 with a sun line of sight 53 impinging on the spacecraft at point 54 after the body rates have been nulled.

The next step is a pitch acquisition in which both the roll and yaw gyro rates are controlled to null and a scan rate, typically 0.75°/sec, is commanded to the pitch axis in a predetermined direction. The chosen direction is not material. The sensors 30 and 40 are monitored to detect sun presence. When the sun is detected in the null position sensing plane 31, 41 of either sensor 30 or 40, a pitch axis angular position of the spacecraft is initialized relative to the sun line of sight. The pitch axis angular position of the spacecraft is propagated in time by integrating the pitch gyro rate measurement. A position and rate control algorithm in the controller 64 is activated in pitch causing the spacecraft to return back to sun sensor null position where the sun line of sight is centered in the field of view of sensor 30 or 40 and the proportional output of the sensor is zero with a sun presence being indicated. The proportional output signal from the solar cells enables the spacecraft to be held in the center of the narrow field of view regardless of the angular width of the field of view. This completes pitch sun acquisition, with the sun line of sight aligned with the roll/pitch plane.

It matters not that the pitch angle overshoots the narrow sun sensor field of view 32 or 42, because the spacecraft is controlled back to the sun sensor null position using integrated gyro reference. After pitch body rate is nulled, the proportional sun sensor pitch measurement is used to continue update of the pitch position, thereby avoiding gyro drift. During the above step, the sun line of sight will traverse the path from its starting point 54 to the point 56 shown in FIG. 3. Because the spacecraft is rotating perpendicularly to the sun sensor's 30, 40 narrow field of view direction, the pitch rotation will not be stopped while the sun is still in the sensor's field of view. Some overshoot of the sensor beyond point 56 will occur as shown by the broken line leading to point 57. Afterwhich the spacecraft controller brings the spacecraft back to the null position of the sensor 30 where the sun line of sight is aligned with the center of the sensor 30 field of view in the narrow direction.

If the sun is not detected in pitch during the above step after sufficient time has been allotted for one full revolution, this indicates that the sun was initially near either the plus or minus pitch axis and is not detected since the sensors 30 and 40 do not cover these polar regions at the extreme plus and minus pitch axis. These regions are referred to as "keyhole" regions. To correct for an initial sun position near the plus or minus pitch axis, a yaw angle adjustment is commanded equal in amplitude to the angular width of the keyhole plus a few degrees margin. Keyholes as large as ±45° are easily tolerated although good design practice would keep the keyhole to approximately ±20° to avoid excess fuel expenditure. The yaw adjustment is sufficient to move the keyhole away from the sun so that a second try at the proceeding step is now guaranteed to succeed in pitch sun acquisition.

The keyhole at the pitch axis polar region is necessary for simplifying the acquisition method. If the fields of view of sensors 30 and 40 included the pitch axis, or are close to the pitch axis, and the sun was initially close to the pitch axis, the sun could be detected by the sensors regardless of the spacecraft position. A different and more complex search algorithm would then be needed to accomplish the sun acquisition.

After the sun has been acquired in pitch, it is held within the field of view of sensors 30 or 40 by a pitch control law which utilizes sun sensor attitude data from the sensors 30 or 40. Meanwhile, a yaw scan rate of 0.25°/sec to 0.75°/sec is commanded to bring the null position sensing plane 21 of sensor 20 toward the sun. The sun line of sight will traverse a path from point 56 to point 58 in FIG. 3. The proper direction for the yaw scan is determined by observing whether the sun was acquired in sensor 30 or sensor 40 during the proceeding step.

The possibility of an incorrect choice exists if the sun was initially acquired in both sensors. This would occur if the sun is near the roll axis and would be sensed by both sensors 30 and 40 due to the overlap of their fields of view. In this event, the acquisition method simply makes a choice and begins the yaw scan. The sun is either acquired in yaw if the choice was correct or scanned off the end of one of the sensors 30 or 40 indicating the choice was incorrect. Once an incorrect choice is noted, the direction of yaw scan is reversed, causing the sensor 20 to scan toward the sun. Final capture for yaw sun acquisition is performed in the same manner as was done in pitch with a momentary overshoot of the sensor 20 field of view 22 being of no consequence.

Logic for implementing the acquisition method may be onboard the spacecraft in controller 64 or on the ground where commands are uplinked to the spacecraft in real time, based on telemetry. In the preferred embodiment, the entire acquisition method is implemented onboard the spacecraft so that sun acquisition is completed autonomously once initiated.

In the preferred embodiment, the pitch scan is halted while the yaw keyhole adjustment is executed. However, if the yaw adjustment is small in amplitude, it may be executed with the pitch axis still scanning. One option, which simplifies the overall logic, is to implement logic that executes a portion of the yaw adjustment during each successive revolution of pitch. The yaw adjustment should be completed during a small part i.e., less than one quarter of a revolution of the pitch scan, and should be performed at approximately the same pitch angle each revolution to ensure removal of the keyhole area from the sun line of sight direction.

In the embodiment illustrated, the sensor 20 is also used for transfer orbit operation and is oriented for such operation. The wide angle field of view of sensor 20 is necessary for transfer orbit operation. If sensor 20 is being used exclusively for sun acquisition or other methods are developed for transfer orbit operation, it would not be necessary for the sensor 20 to have a wide angle field of view in the roll/yaw plane since sun acquisition in the roll/pitch plane is accomplished first. A small field of view in both directions, only large enough to ensure alignment with the roll axis is required.

It is an advantage of the method of the present invention that sun acquisition with a three axes stabilized spacecraft is accomplished using three sun sensors having fields of view which are relatively narrow in one direction. This reduces the amount of reflective light that enters the sun sensors, giving the spacecraft designer greater latitude in placing the sensors on a spacecraft having large reflective appendages such as antennas or solar arrays. The method utilizes three axes gyro rate and integrated rate sensing together with three slit type sun sensors to accomplish the sun acquisition with the narrow field of view sensors.

It is to be understood that the invention is not limited to the exact construction or method illustrated and described above, but that various changes and modifications may be made without departing from the spirit and scope of the invention as defined in the following claims. Once such modification is the use of a sun sensor that, instead of a null position defined by the output of a pair of solar cells, uses a measured output from a single light sensitive element to define a sensing plane. Another possible modification is the use of a single sun sensor in the roll/pitch plane with an arbitrary rotation direction about the yaw axis used to culminate acquisition. While this is possible, additional fuel will be used to correct for initial rotation about the y axis in the wrong direction.

What is claimed is:

1. A spacecraft stabilized in three mutually orthogonel x, y and z axes comprising:
    a spacecraft body;
    sensing means for detecting sunlight having a pair of sensing planes, a first sensing plane of said pair lying in the xz plane of the spacecraft and a second sensing plane of said pair lying in the xy plane of the spacecraft, said sensing planes intersecting at the x axis;
    control means for controlling the orientation of the spacecraft to orient the x axis toward the sun, said control means including means for rotating said spacecraft about the y axis in one direction at a predetermined scan rate while maintaining rotation about the x and z axes at substantially zero, means for initializing a y axis angular position of a spacecraft relative to the sun line of sight when the sun line of sight is aligned with said second sensing plane, means for porpagating the spacecraft y axis angular position in time relative to the initialized y axis angular position by calculation from a y axis rate measurement means for rotating said spacecraft in the opposite direction about said y axis to return said spacecraft to a position with the sun line of sight aligned with the second sensing plane and for stopping rotation of the spacecraft about the y axis, means for rotating said spacecraft about said z axis in one direction at a predetermined scan rate, means for initializing a z axis angular position of the spacecraft relative to the sun line of sight once the sun line of sight is aligned with said first sensing plane, means for propagating the spacecraft z axis angular position in time relative to the initialized z axis angular position by calculation from a z axis rate measurement, means for rotating the spacecraft in the opposite direction about the z axis to return the spacecraft to a position with the sun line of sight aligned with the first sensing plane and to stop rotation of the spacecraft about the z axis.

2. The spacecraft of claim 1 wherein said second sensing plane includes an angular portion of the xy plane of less than 180° and said control means, after rotation of said spacecraft about the y axis for one revolution and failure to sense the sun in said second sensing plane, including means for rotating said spacecraft about said z axis an angular amount greater than the angular extent of the xz plane not within the second sensing plane.

3. The spacecraft of claim 1 wherein said sensing means includes first, second and third sensors each having a rectangular field of view with a sensing plane therein, the sensing plane of said first sensor forming said first sensing plane;
    said second and third sensors being mounted with their sensing planes oriented with the xy plane and including the x axis and being symmetrical about the x axis to form said second sensing plane; and
    said control means rotating the spacecraft about the z axis in one direction when the sun line of sight is aligned with the sensing plane of the second sensor and rotating the spacecraft in the opposite direction when the sun line of sight is aligned with the sensing plane of the third sensor.

4. The spacecraft of claim 3 wherein said control means rotates the spacecraft in one direction if the sun line of sight is aligned with the sensing planes of both the second and third sensors simultaneously until either the sun line of sight is aligned with the x axis or the sun line of sight leaves the field of view of one of said second or third sensors, after which the direction of rotation about the z axis is reversed.

5. The spacecraft of claim 3 wherein said second sensing plane includes an angular extent of the xy plane of between ±45° and ±80° and said control means rotates said spacecraft about the z axis an amount greater than the angular extent of the xy plane not included in the second sensing plane if rotation of one revolution about said y axis fails to align the sun line of sight with the second sensing plane.

6. The spacecraft of claim 5 wherein the control means performs the rotation about the z axis while the spacecraft is rotating about the y axis.

7. The spacecraft of claim 3 wherein each of said sensors includes a pair of solar cells and the sensing plane of each sensor is defined by a sensor null position where the difference in the outputs of the two solar cells is equal to zero.

8. The spacecraft of claim 3 wherein said first, second and third sensors have a field of view which is no more than ±5° in width in a direction normal to the sensing planes of each sensor.

9. A method of sun search and acquisition for a spacecraft stabilized in x, y and z mutually orthogonal axes and having sensing means capable of detecting alignment of the sun line of sight with an angular portion of the xy plane including the x axis and capable of detecting alignment of the sun line of sight with the x axis, said method comprising the steps of:

a) rotating said spacecraft about said y axis in one direction at a predetermined scan rate while maintaining rotation about the x and z axes at substantially zero;

b) once said angular portion of the xy plane is aligned with the sun line of sight, initializing a y axis angular position of the spacecraft relative to the sun line of sight;

c) propagating the spacecraft y axis angular position in time relative to the initialized y axis angular position by calculation from a y axis rate measurement;

d) rotating said spacecraft in the opposite direction about the y axis to return the spacecraft to a position with said portion of the xy plane aligned with the sun line of sight;

e) stopping rotation of the spacecraft about the y axis and maintaining said spacecraft in a position with the sun line of sight aligned with said portion of the xy plane;

f) rotating said spacecraft about said z axis in one direction at a predetermined scan rate;

g) once said x axis is aligned with the sun line of sight, initializing a z axis angular position of the spacecraft relative to the sun line of sight;

h) propagating the spacecraft z axis angular position in time relative to the initialized z axis angular position by calculation from a z axis rate measurement;

i) rotating said spacecraft in the opposite direction about the z axis to return the spacecraft to a position with the x axis aligned with the sun line of sight; and j) stopping rotation of the spacecraft about the z axis to maintain the spacecraft in a position with the x axis aligned with the sun line of sight.

10. The method of claim 9 further comprising the step of: k) rotating the spacecraft about said z axis a predetermined amount if rotation of one full revolution about said y axis in Step a) fails to align said portion of the xy plane with the sun line of sight.

11. The method of claim 10 wherein said rotation about the z axis in Step k) is accomplished during rotation of the spacecraft about the y axis in Step a).

12. The method of claim 9 further comprising the step of: k) reversing the direction of rotation of said spacecraft about said z axis if initial alignment of the x axis with the sun line of sight is not reached after a predetermined angular rotation about said z axis in Step f).

13. The method of claim 9 wherein alignment of the sun line of sight with the x axis in Step g) is detected by positioning a first sensor on said spacecraft with a field of view including the x axis and having a planar null position aligned with the xz plane and including the x axis; and wherein alignment of the sun line of sight with said portion of the xy plane, in Step b) is detected by positioning second and third sun sensors on said spacecraft having a combined field of view in the xy plane of between ±45° and ±80°, with said second and third sensors including the x axis in their fields of view and having planar null positions aligned with the xy plane and including the x axis whereby the sun line of sight is aligned with the x axis when said sun line of sight is aligned with the null position of all three sensors.

* * * * *

UNITED STATES PATENT AND TRADEMARK OFFICE
CERTIFICATE OF CORRECTION

PATENT NO. : 5,255,879
DATED : October 26, 1993
INVENTOR(S) : John F. Yocum, Michael W. Tolmasoff, and Thomas D. Faber It is certified that error appears in the above-identified patent and that said Letters Patent is hereby corrected as shown below:

In Column 5:

Line 59, change "...position of a space-"... to "position of the space-..."

Line 62, change "porpagating" to "propagating"

Line 65, insert a comma after "measurement."

Signed and Sealed this

Thirteenth Day of September, 1994

Attest:

BRUCE LEHMAN

Attesting Officer

Commissioner of Patents and Trademarks